(12) United States Patent
Isayev et al.

(10) Patent No.: US 6,713,600 B1
(45) Date of Patent: Mar. 30, 2004

(54) ULTRASOUND ASSISTED PROCESS FOR INCREASING THE CRYSTALLINITY OF SLOW CRYSTALLIZABLE POLYMERS

(75) Inventors: Avraam Isayev, Akron, OH (US); Horst Hans Rieckert, Calw (DE)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 10/342,075

(22) Filed: Jan. 14, 2003

(51) Int. Cl.$^7$ ................................................ C08F 6/00
(52) U.S. Cl. ........................................ 528/502; 73/570
(58) Field of Search ............................ 528/502; 73/570

(56) References Cited

U.S. PATENT DOCUMENTS 4,757,035 A * 7/1988 Baney et al. ................. 501/88
5,410,984 A * 5/1995 Pikus et al. .................. 117/206
5,519,211 A * 5/1996 Bur et al. ............... 250/227.19

* cited by examiner

*Primary Examiner*—Terressa Boykin
(74) *Attorney, Agent, or Firm*—Roetzel & Andress

(57) ABSTRACT

In general, the present invention provides a process for increasing the crystallinity of a slow crystallizable polymer. In this process, at least one slow crystallizable polymer is introduced to a pressurized treatment zone along a flow direction, and is subjected, at the pressurized treatment zone, to longitudinal vibrations of ultrasonic waves. In a particularly preferred process, the ultrasonic waves propagate in a direction perpendicular to the flow direction of the at least one slow crystallizable polymer.

4 Claims, 2 Drawing Sheets

ULTRASOUND ASSISTED PROCESS FOR INCREASING THE CRYSTALLINITY OF SLOW CRYSTALLIZABLE POLYMERS

BACKGROUND OF THE INVENTION

The present invention relates to an ultrasound assisted process for increasing the crystallinity and crystallization rate of slow crystallizable polymers. More particularly, the present invention relates to a process wherein slow crystallizable polymer melts are subjected to ultrasound treatment, in a pressurized treatment zone, to bring about an increased rate of crystallization. Slow crystallizable polymers, such as polyesters, are of particular interest.

The conversion of a crystallizable polymer from the amorphous to crystalline state is generally achieved simply through cooling of the crystallizable polymer. Increasing the rate of crystallization or the level of crystallinity can also be achieved by stretching of the crystallizable polymer, under certain temperature conditions. This method, however, involves apparatus for stretching and heating, and may only be used when producing certain products, such as, for example, spun fibers or drawn films.

There exist a need in the art for a process to increase the crystallinity of a crystallizable polymer during other processes, such as blow molding, injection molding, and extrusion. The process of the present invention serves to provide a means for increasing the crystallinity or rate of crystallization of crystallizable polymers, particularly "slow" crystallizable polymers, in processes not limited to those involving stretching and heating, and will include processes such as blow molding, injection molding and extrusion.

Herein, "slow crystallizable polymers" are to be considered those crystallizable polymers that exhibit crystallization rates lower than that of polyolefins, such as polyethylene and polypropylenes. By way of non-limiting example, slow crystallizable polymers include certain types of polyesters, polyimides and polyethers. Given the criteria above, "slow crystallizable polymers" will be readily identifiable by those of skill in the art.

Polyesters are of particular interest in the present invention. Polyesters are widely used to manufacture fibers, films, bottles, and other various molded extruded, and spun products, and are known to be slow crystallizable polymers. The ability to control their crystallinity during processing methods, such as molding, extrusion, and fiber spinning, would allow for the manufacture of products having desirable properties. Thus, in a particular embodiment, the present invention proposes an ultrasonic assisted process for making novel polyester resins and products thereof having controlled crystallinity.

SUMMARY OF THE INVENTION

In general, the present invention provides a process for increasing the crystallinity of a slow crystallizable polymer. In this process, at least one slow crystallizable polymer is introduced to a pressurized treatment zone along a flow direction, and is subjected, at the pressurized treatment zone, to longitudinal vibrations of ultrasonic waves. In a particularly preferred process, the ultrasonic waves propagate in a direction perpendicular to the flow direction of the at least one slow crystallizable polymer.

The process herein is practiced as a continuous process, and, after ultrasonic treatment in the pressurized treatment zone, the at least one slow crystallizable polymer may be advanced to typical molding, extruding, fiber spinning or other apparatus. Thus, the crystallinity of the at least one slow crystallizable polymer may be controlled during processes for manufacturing useful products from such polymers.

Without wishing to be bound to any particular theory, the increased crystallinity of the slow crystallizable polymers subjected to the present process is believed to be due to a rearrangement and change of mobility of the crystallizable entities in the at least one slow crystallizable polymer that is brought about by the application of the ultrasonic waves. For a given crystallizable polymer or mixture of multiple crystallizable polymers, it may be possible to prepare polymer resins of controlled crystallinity suitable to manufacture products having desirable properties.

As a product of the present process, this invention provides a crystallized polymer prepared by the process for increasing the crystallinity of a crystallizable polymer comprising the steps of introducing at least one slow crystallizable polymer to a pressurized treatment zone and subjecting the at least one crystallizable polymer, at the pressurized treatment zone, to longitudinal vibrations of ultrasonic waves. These crystallizable polymer products are preferably introduced to the pressurized zone along a flow direction that is perpendicular to the direction in which the ultrasonic waves propagate.

PREFERRED EMBODIMENT FOR CARRYING OUT THE INVENTION

Figure 1:
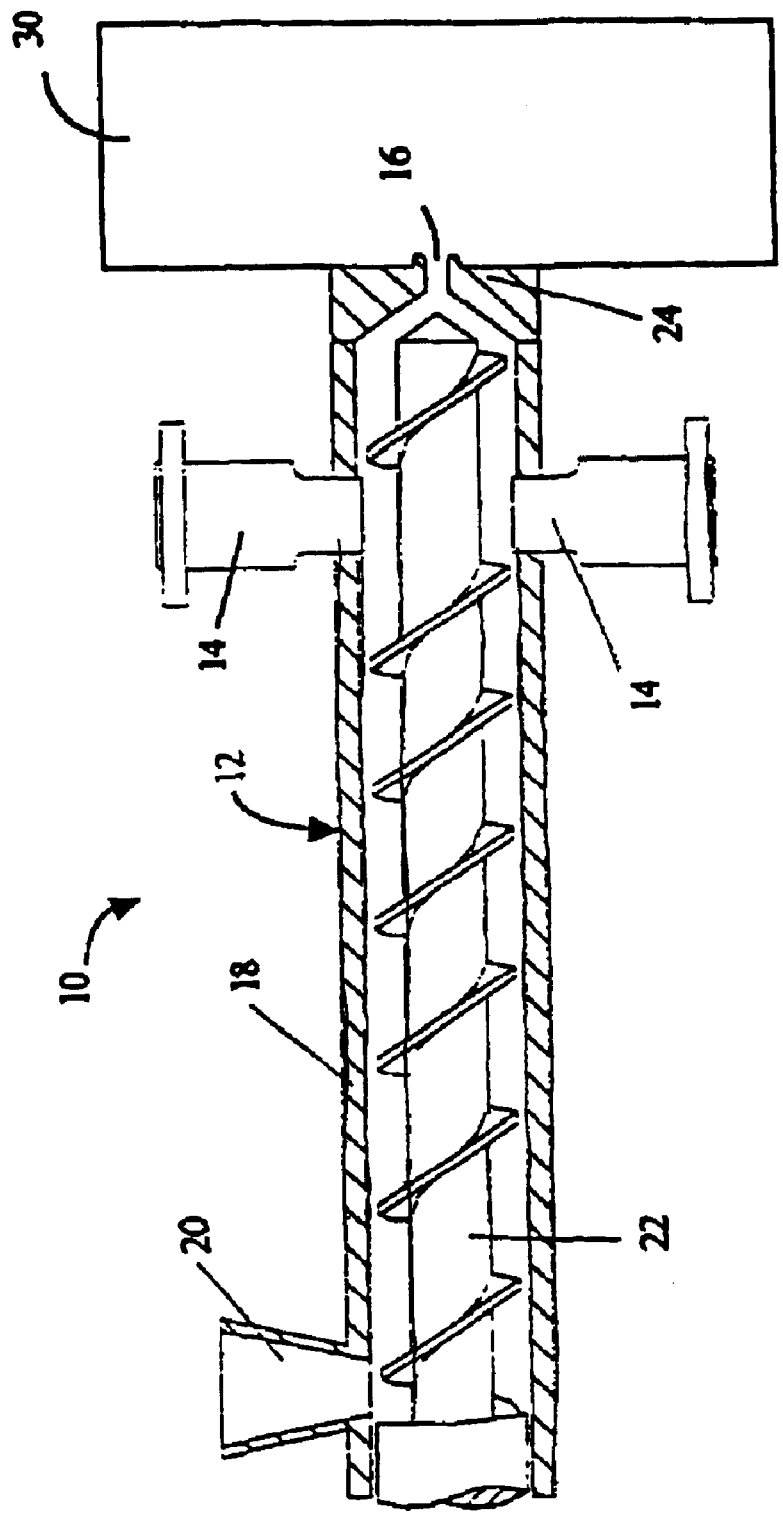
FIG. 1 is a schematic of a cross-sectional view of a reactor for practicing this invention, including a single screw extruder having a die with two ultrasonic horns placed before the die and perpendicular to the screw axis.

It has been discovered that the application of certain levels of ultrasonic amplitudes, in the presence of pressure and heat, unexpectedly enhances the crystallization rate of slow crystallizable polymers, such that products of increased crystallinity can be achieved as compared to products of the sane, yet untreated, slow crystallizable polymer. The process of the present invention generally entails feeding at least one slow crystallizable polymer into a pressurized treatment zone, and subjecting this at least one slow crystallizable polymer, while in the molten state, to treatment with longitudinal vibrations of ultrasonic waves, within this pressurized treatment zone.

In one embodiment, the process is carried out as a continuous process, such that the at least one slow crystallizable polymer flows into and through the pressurized treatment zone in a particular flow direction, and is subjected to ultrasonic waves. In preferred embodiments of this continuous process, the ultrasonic waves propagate in a direction perpendicular to the flow direction of the at least one slow crystallizable polymer. In either case, at the exit of the pressurized treatment zone, the at last one slow crystallizable polymer, which has just been subjected to ultrasonic treatment, may be advanced to well-known apparatus for molding, extrusion, or fiber spinning, or, indeed, may be advanced to any other applications in which the treated slow crystallizable polymer might be deemed useful.

Slow crystallizable polymers are generally known in the art, and any such polymer may be employed to practice the present invention. It will be appreciated that "slow crystallizable polymer" is not easily defined, but, rather, is more or less understood from qualified, rather than quantified, properties. For purposes herein the term "slow crystallizable polymer(s)" is to be understood to describe those polymers that are mainly amorphous in the undeformed melt state, and can be obtained in an amorphous state after rapid cooling, although they might crystallize upon stretching or, annealing. Suitable slow crystallizable polymers for use in this invention include, without limitation, slow crystallizable polyesters, slow crystallizable wholly aromatic polyesters, slow crystallizable copolyesters, slow crystallizable polyamides, slow crystallizable polyethers and poly (phenylene sulfide).

Crystallizable polyesters for use in the present invention include, without limitation, polyethylene terephthalate (PET), polybutylene terephthalate (PBT), polyethylene naphthalate (PEN), poly(3-oxybutanoate), copolyesters and wholly aromatic polyesters. Non-limiting examples of suitable slow crystallizable polyamides include various polyamides (such as Nylons), poly(hexamethylene adipamide), poly(m-phenylene isophthalamide), poly(metaxylylene adipamide), and poly(ester esteramide). Suitable crystallizable polyethers may include, without limitation, polyetheretherketone, polyetherketone, and crystallizable substituted (e.g. halo) polyolefins such as substituted polyvinylidenes. By further example suitable slow crystallizable polymers include polyhydroxybutyric acid, poly(vinylidene fluoride), polyoxymethylene and polyoxyethylene.

The ultrasonic assisted process of this invention is employed with "at least one" slow crystallizable polymer. Thus, it will be appreciated that the polymer melt that is treated as herein disclosed may include more than one slow crystallizable polymer or may include additional, noncrystallizable polymers. The polyesters are of particular concern. Thus, in particularly preferred embodiments, the polymer melt that is ultrasonically treated according to this invention includes a polyester selected from PET, PBT, PEN, copolyesters, wholly aromatic polyesters, and mixtures thereof.

In the continuous process embodiment, the pressurized treatment zone is preferably provided by a continuous-flow apparatus that can exert pressure on an at least one slow crystallizable polymer melt and advance the polymer melt, after ultrasonic treatment, to a desired product-forming apparatus or shaping zone, such as, but not limited to, an extrusion apparatus, blow molding apparatus, injection molding apparatus, film drawing apparatus, or fiber spinning apparatus. Single and twin screw extruders are particular, non-limiting examples of useful apparatus of this kind. Even when only one slow crystallizable polymer, without any additional components, comprises the at least one slow crystallizable polymer melt to be treated, the mixing action of an extruder will be found to be advantageous because the mixing motion will help to bring a greater amount of the polymer melt into close proximity to the ultrasonic horns employed. A dispersive or distributive mixer might also be employed as a mixing zone incorporated into the continuous-flow apparatus to achieve beneficial and more uniform results. The mixing action is particularly beneficial when the at least one slow crystallizable polymer melt includes more than one slow crystallizable polymer or a crystallizable polymer and additional components. Non-limiting examples of useful continuous-flow apparatus include single screw extruders, pin barrel extruders, twin screw extruders, single screw extruders with attached static mixers, single screw extruders with mixing sections, twin screw extruders with attached mixing sections, Buss Ko-Kneader extruders, modular twin screw extruders, and the like.

Referring now to the drawings, wherein the showings are for purposes of illustrating the preferred embodiment of the invention only and not for purposes of limiting the same, the Figures show the application of ultrasonic treatment to the production of polymers of increased crystallinity as compared to the same, yet non-ultrasonically treated, polymers.

With reference to FIG. 1, a particular embodiment of a continuous-flow apparatus for carrying out this invention is generally represented by the numeral 10. Apparatus 10 includes a single screw extruder 12, with two ultrasonic horns 14 placed proximate the extruder exit 16, perpendicular to the screw axis. As shown, single screw extruder 12 includes a barrel 18, which is fed through hopper 20. Screw 22, within barrel 18, is capable of advancing a polymer melt toward exit 16 in die 24. Thus, the at least one slow crystallizable polymer may be added at hopper 20 and advanced toward exit 16. Typically, the at least one slow crystallizable polymer would be added as polymer pellets, and the apparatus 10 would be maintained at a high enough temperature to form a polymer melt of the polymer pellets fed thereto. Exit 16 will resist polymer flow and, therefore, it will be appreciated that the at least one slow crystallizable polymer will be placed under pressure inside barrel 18.

Figure 2:
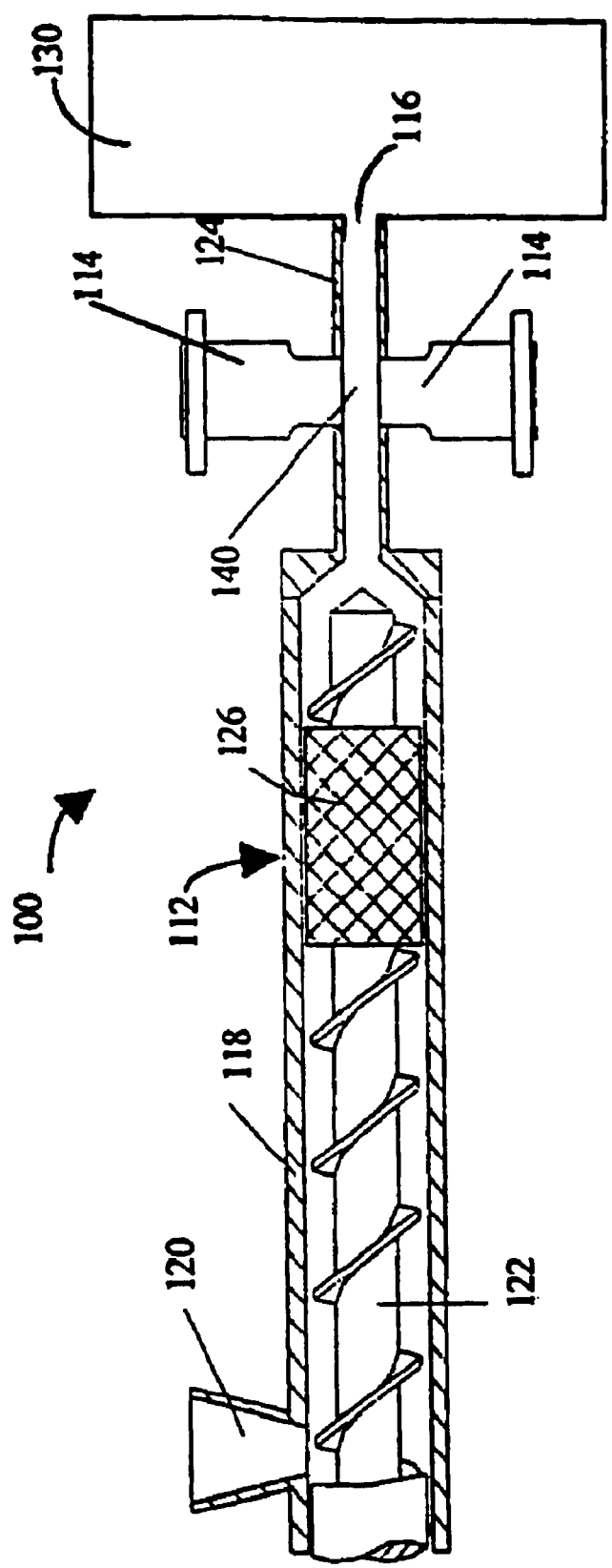
FIG. 2 is a schematic of a cross-sectional view of an alternative reactor for practicing this invention, including a single screw extruder with a dispersive distributive mixing section and a die attachment into which the ultrasonic horns extend and are separated by a gap.

Thus, at least one slow crystallizable polymer is added at hopper 20 and advanced, in the molten state, by screw 22, from hopper 20 to exit 16. As the polymer mixture is forced through exit 16 pressure is built up within barrel 18, due to the narrowing of the path through which the polymer melt must advance. Upon operation of ultrasonic horns 14, the polymer melt is subjected to ultrasonic treatment proximate exit 16, and, thus, for purposes of this invention, it is to be generally understood that the at least one slow crystallizable polymer melt is advanced through a pressurized treatment zone and is subjected to treatment with an ultrasonic wave within this pressurized treatment zone. From this pressurized treatment zone, the treated at least one slow crystallizable polymer melt may be advanced to known product-forming apparatus or shaping apparatus, which are generally designated by the numeral 30. It should be noted that to realize the benefits of the present invention in a shaped product, the polymer melt, after ultrasonic treatment must be advanced to the shaping zone and shaped within a short amount of time, and, thus, should not be solidified in the interim between ultrasonic treatment and shaping. It is preferred that the shaping zone be in line with the treatment zone, as shown in FIGS. 1 and 2. The product-forming apparatus or shaping zone may include, without limitation, blow molding apparatus, injection molding apparatus, film drawing apparatus, fiber spinning apparatus, and the like.

When either more than one slow crystallizable polymer is to be employed as the polymer melt or when a single slow crystallizable polymer is to be mixed with an additional component, it should be appreciated that, while it is possible to add the individual polymers to the hopper 20 as separate, individual components, the polymers to be treated may be premixed and pelletized before addition to an ultrasonic apparatus according to this invention. In such instances, the polymers may be premixed in an extruder, absent any ultrasonic treatment, cooled, and thereafter pelletized, such that non-treated, pelletized polymer mixtures may be fed to the apparatus wherein the mixture is to be ultrasonically treated.

Pressure affects the process of the present invention by introducing volumetric compression in the at least one slow crystallizable polymer melt, leading to more efficient propagation of the ultrasonic waves. Thus, an increase in pressure exerted on the polymer melt during ultrasonic treatment will tend to increase the effect of the ultrasonic waves, while a decrease in the pressure exerted on the polymer melt during ultrasonic treatment will tend to decrease the effect of the ultrasonic waves. In a preferred embodiment of this invention, the pressure at the treatment zone is between about 0.6 to about 35 MPa, but lower and larger pressures are also envisioned.

While FIG. 1 and the discussion thereof has focused, in particular, on the application of an extruder to advance the at least one slow crystallizable polymer to a pressurized treatment zone, there is no reason to limit the invention to such. Indeed, it is merely necessary that the apparatus employed be capable of advancing the at least one slow crystallizable polymer, in the molten state, and under pressure, toward an ultrasonic treatment zone wherein the at least one crystallizable polymer is exposed to longitudinal ultrasonic waves.

As mentioned, the at least one slow crystallizable polymer is to be ultrasonically treated while in the molten state. Therefore, the apparatus employed should be capable of being heated. The heating of the apparatus, such as with apparatus 10 of FIG. 1, tends to decrease the internal pressure and leads to reduction of the power consumption of the motor. When necessary, heat may be added to the system to properly carry out this invention. More particularly, the process of this invention is carried out at a temperature that is above the melting point of the individual polymers that make up the at least one slow crystallizable polymer. Various polymer mixtures will require processes carried out at various temperatures, and operable temperatures may need to be determined experimentally for a given at least one slow crystallizable polymer.

The energy imparted by the ultrasonic waves and imposed on the at least one slow crystallizable polymer, in the presence of pressure and heat, is believed to be responsible for increasing the crystallization rate of the at least slow crystallizable polymer and, thus, believed responsible for yielding polymer resins or polymeric products of higher crystallinity as compared to products of the same slow crystallizable polymers without ultrasonic treatment.

Considerable latitude is permissible in selecting the wave frequency and amplitude of the ultrasonic treatment, and, optimum conditions for particular at least one crystallizable polymer melts are best determined by experimental trials conducted on the crystallizable polymer melt of interest. It has been found, however, that the frequency of the waves should be in the ultrasound region, ie., at least 15 kHz, while the amplitude of the waves can be varied from about one micron to about one hundred microns, with the exact amplitude and frequency best suited for a particular application being readily determined by experimentation and crystallization levels achieved. For polyester melts, as seen below in the Experimental Section, amplitudes of 5 $\mu$m and 7.5 $\mu$m were found to be particularly preferred.

It should be appreciated that, while the positioning of ultrasonic horns 14, in the apparatus of FIG. 1, serves to disclose a process in which the ultrasonic waves propagate in a direction perpendicular to the flow direction of the at least one slow crystallizable polymer, the present invention is not limited thereto or thereby. Thus, the process of the present invention also includes processes in which the ultrasonic waves propagate in directions off of perpendicular to the direction of flow of the at least one slow crystallizable polymer. Ultrasonic waves propagating in a direction perpendicular to the flow direction are, however, employed in the Experimental Section herein below, and are particularly preferred.

Referring to FIG. 2, another embodiment of a continuous-flow apparatus is depicted. Therein, a single screw extruder is also employed, as with the embodiment of FIG. 1, and, in order to facilitate disclosure, like parts of the apparatus of FIG. 2 have received like numerals in comparison with FIG. 1, although increased by 100. Thus, at least one slow crystallizable polymer is added at hopper 120 and advanced, in the molten state, by screw 122, from hopper 122 exit 116. Exit 116, however, does not feed directly to a product-forming or shaping zone, as with the embodiment of FIG. 1. Rather, exit 116 feeds into a die attachment 124. Furthermore, ultrasonic horns 114 are not placed on the screw side of exit 116, as they are in FIG. 1, but, rather, are positioned in die attachment 124. In this configuration, the ultrasonic horns 114 are placed in closer proximity, without the bulk of extruder screw 122 placed therebetween. This configuration is believed to be advantageous because of the possibility of interaction of two ultrasonic waves emanating from two horns. The ultrasonic horns 114 are configured with a gap 140 therebetween, which may be determined according to the achievement of desired experimental results, and which generally may range from about 0.5 mm to about 20 mm, with the understanding that the size of gap 140 might affect the crystallization rate. Generally, smaller gap sizes are preferred, on the order of from about 0.5 mm to about 10 mm. Gap sizes in the range of from 0.5 to 5 mm may also be preferred.

FIG. 2 also shows an apparatus in which a dispersive or distributive mixer, generally designated by the numeral 126, is provided in barrel 118. As mentioned, such mixers 126 would be particularly useful when employing more than one slow crystallizable polymer or a mixture of one slow crystallizable polymer with an additional component The mixer 126 is, however, optional. As with the embodiment of FIG. 1, the apparatus of FIG. 2 advances the polymer melt, after ultrasonic treatment, to a desired product-forming apparatus or shaping zone 130. Parameters regarding pressure, temperature, horn positioning, and wave frequency in amplitude may vary as discussed above.

EXPERIMENTAL

In order to demonstrate the practice of the present invention, the following examples have been prepared and tested as described. The examples should not, however, be viewed as limiting the scope of the invention. The claims will serve to define the invention. Bottle grade PET pellets were vacuum dried at 80° C. and then extruded using a single screw extruder. The single screw extruder had a slit die attachment followed by a die having three holes of 3.125 mm in diameter. The PET was fed at a rate of 5 lb/hr. The screw speed was set at 100 rpm, and the single screw extruder had zone temperatures of 220C./240C./260C./260C./260C./260C. The extrudates exiting the shaping die were cooled in a water bath and drawn on to a take up bobbin that rotated at a constant speed. Two 3.3 Kw ultrasonic power supplies, ultrasonic transducers, booster, and water-cooled horns of square cross-sections of 38.1 by 38.1 mm$^2$ imposed ultrasonic waves with a frequency of 20 KHz and various amplitudes (5 and 7.5 $\mu$m) on the PET melt. The horns were placed in the slit die of rectangular cross-section, with dimensions of 157.5×38.1×2 mm$^3$. A pressure transducer was placed in the slit die, before the treatment zone. Extrusion runs were made with and without the imposition of ultrasonic waves.

A summary of the extrusion conditions are provided below.

| Extrusion Conditions Under Ultrasonic Treatment | |
| --- | --- |
| Sample | PET, bottle grade |
| Attached die | ⅛" Diameter |
| Distance from die exit to water bath | 6" |
| Horn to Horn Gap Size (mm) | 2 |
| Screw speed (rpm) | 100 |
| Feed rate | 5 lb/hr |
| Rotational speed setting at take up | 10 |

| Pressure at the die entrance | |
| --- | --- |
| Amplitude ($\mu$m) | Before treatment zone (psi) |
| 7.5 | 45–105 |
| 5 | 55–155 |
| 0 | 3500–4000 |

As shown by the data below in Table 1, it was discovered that the untreated and treated PET samples unexpectedly showed substantially different crystallization behavior. More particularly, the treated and untreated samples were subjected to a heating scan from room temperature to 300° C., increasing at 10° C., per minute, and conducted in a nitrogen atmosphere. The sample not subjected to ultrasound showed a glass transition temperature (Tg) of 72.1° C., followed by cold crystallization ($T_c$) at 137.5° C., exhibiting a heat of crystallization ($\Delta H_c$) of 24.6 J/g, followed by a melting point ($T_m$) at 249° C., with a heat of melting ($\Delta H_m$) of 41.3 J/g. The sample subjected to ultrasound at an amplitude of 5 microns showed an elevated $T_g$ of 79.1° C., followed by melting, without cold crystallization, at $T_m$ of 247.2° C., with a ($\Delta H_m$) of 38.7 J/g. The sample subjected to ultrasound at 7.5 microns showed an elevated $T_g$ of 89.2° C., followed by melting, without cold crystallization, at $T_m$ of 247.3° C., with a ($\Delta H_m$) of 40.0 J/g.

Crystallinity was calculated for each of these samples by dividing the difference between the heat of melting and heat of crystallization by the heat of fusion of PET crystals (about 120 J/g). From this calculation, it is clear that the treated melt, during cooling immediately after ultrasonic treatment, exhibited unexpectedly much higher crystallization rate, leading to high crystallinity upon cooling. This higher crystallinity level will be present in products made of ultrasonically treated melts. However, the effect disappears upon cooling and second heating scan, as indicated in Tables 2 and 3.

TABLE 1

Thermal characterization during first heating scan

| Amplitude ($\mu$m) | $T_g$ (C) | $T_c$ (C) | $\Delta H_c$ (J/g) | $T_m$ (C) | $\Delta H_m$ (J/g) |
| --- | --- | --- | --- | --- | --- |
| 0 | 72.1 | 137.5 | 24.6 | 249.0 | 41.3 |
| 5 | 79.1 | — | — | 247.2 | 38.7 |
| 7.5 | 89.2 | — | — | 247.3 | 40.0 |

PERKIN-ELMER DSC
Sample: PET, bottle grade
Ramp: 10 C/min; $N_2$ gas purge 75 ml/min
Scan from room temperature to 300° C.

TABLE 2

Thermal characterization during cooling scan

| Amplitude ($\mu$m) | $T_c$ (C) | $\Delta H_c$ (J/g) |
| --- | --- | --- |
| 0 | 179.9 | 35.1 |
| 5 | 182.2 | 32.4 |
| 7.5 | 183.5 | 34.7 |

PERKIN-ELMER DSC
Sample: PET, bottle grade
Ramp: 10 C/min; $N_2$ gas purge 75 ml/min
Cooling from 300° C. to room temperature after 1st heating scan

TABLE 3

Thermal characterization during second heating scan

| Amplitude ($\mu$m) | $T_g$ (C) | $T_m$ (C) | $\Delta H_c$ (J/g) |
| --- | --- | --- | --- |
| 0 | 78.2 | 246.7 | 34.9 |
| 5 | 80.8 | 244.6 | 32.2 |
| 7.5 | 79.8 | 245.2 | 31.6 |

PERKIN-ELMER DSC
Sample: PET, bottle grade
Ramp: 10 C/min; $N_2$ gas purge 75 ml/min
After cooling scan from room temperature to 300° C.

In light of the foregoing, it should thus be evident that the process of the present invention, providing an ultrasound assisted process for increasing the crystallinity of crystallizable polymers, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A crystallized polymer prepared by a process for increasing the crystallinity of a crystallizable polymer comprising the steps of:

introducing at least one crystallizable polymer to a pressurized treatment zone along a flow direction;

subjecting the at least one crystallizable polymer, at the pressurized treatment zone, to longitudinal vibrations of ultrasonic waves.

2. The crystallized polymer prepared by the process of claim 1, wherein the ultrasonic waves in said step of subjecting, propagate in a direction perpendicular to the flow direction of the at least one crystallizable polymer.

3. A process for increasing the crystallinity of a crystallizable polymer comprising the steps of:

introducing at least one crystallizable polymer to a pressurized treatment zone along a flow direction;

subjecting the at least one crystallizable polymer, at the pressurized treatment zone, to longitudinal vibrations of ultrasonic waves, wherein the ultrasonic waves propagate in a direction perpendicular to the flow direction of the at least one crystallizable polymer.

4. A process for making a polymer product of increased crystallinity comprising the steps of:

introducing at least one crystallizable polymer to a pressurized treatment zone along a flow direction;

subjecting the at least one crystallizable polymer, at the pressurized treatment zone, to longitudinal vibrations of ultrasonic waves, wherein the ultrasonic waves propagate in a direction perpendicular to the flow direction of the at least one crystallizable polymer; and thereafter immediately shaping the at least one crystallizable polymer into a desired product.

* * * * *